US006726065B2

(12) United States Patent  (10) Patent No.: US 6,726,065 B2
Sanders                     (45) Date of Patent:     Apr. 27, 2004

(54) MODULAR AUTOMATIC COLORANT DISPENSER

(76) Inventor: Brian C. Sanders, c/o ColorEng., 8 Industrial Way, E-5, Salem, NH (US) 03079

( * ) Notice: Subject to any disclaimer, the term of this patent is extended or adjusted under 35 U.S.C. 154(b) by 0 days.

(21) Appl. No.: 10/067,693

(22) Filed: Feb. 4, 2002

(65) Prior Publication Data

US 2003/0146244 A1 Aug. 7, 2003

(51) Int. Cl.$^7$ ................................................ B65D 88/54
(52) U.S. Cl. ...................... 222/333; 222/63; 222/383.2; 417/410.4; 418/206.1
(58) Field of Search ................... 222/63, 333, 383.2, 222/135; 417/410.4, 326; 418/206.1, 206.7

(56) References Cited

U.S. PATENT DOCUMENTS

| | | | | | |
|---|---|---|---|---|---|
| 2,545,588 | A | * | 3/1951 | Pulse | 222/185.1 |
| 2,623,469 | A | * | 12/1952 | Gray | 417/310 |
| 3,131,643 | A | * | 5/1964 | Marietta | 418/132 |
| 3,750,910 | A | * | 8/1973 | Se-kit | 222/239 |
| 4,046,287 | A | * | 9/1977 | Hoekstra et al. | 222/16 |
| 4,184,331 | A | * | 1/1980 | Bentley | 60/375 |
| 4,278,132 | A | * | 7/1981 | Hostetter | 169/13 |
| 4,323,097 | A | * | 4/1982 | Achen | 141/168 |
| 4,371,324 | A | * | 2/1983 | Gustafsson | 418/201.3 |
| 5,005,982 | A | * | 4/1991 | Kistner | 366/272 |
| 5,224,838 | A | * | 7/1993 | Baumgarten | 417/205 |
| 5,328,057 | A | * | 7/1994 | Hellenberg et al. | 222/135 |
| 5,423,661 | A | * | 6/1995 | Gabeler et al. | 417/410.4 |
| 5,445,195 | A | * | 8/1995 | Kim | 141/104 |
| 5,480,288 | A | * | 1/1996 | Hellenberg et al. | 417/313 |
| 6,164,497 | A | * | 12/2000 | Chia et al. | 222/309 |
| 6,206,666 | B1 | * | 3/2001 | Steinrock et al. | 418/110 |
| 6,398,513 | B1 | * | 6/2002 | Amsler et al. | 417/63 |
| 6,537,048 | B2 | * | 3/2003 | Rost et al. | 418/201.1 |

* cited by examiner

*Primary Examiner*—Gene Mancene
*Assistant Examiner*—Frederick C Nicolas
(74) *Attorney, Agent, or Firm*—William B. Ritchie (57) ABSTRACT

An automatic colorant dispenser having a compact modular design incorporating simply installed, precision stepper-motor driven, colorant pump modules, specifically designed to provide maximum abrasion resistance using advanced aerospace technologies plus exceptional operational life utilizing high quality, high precision and high reliability mechanical and electrical components. By employing advanced performance materials and space saving, compact geometric and ergonomic design methodology in the fully modular automatic colorant dispenser, up to sixteen space saving, two gallon colorant canister modules are efficiently grouped and directly connected to their respective energy-saving colorant pump modules. All component modules have been ergonomically located behind large open access panels to ultimately maintain the system with maximum convenience and simplicity. Built-in retractable production shelves provide maximum operational versatility but retract into a compact 2'×4' footprint weighing only 440 pounds. Stainless steel used on all working surfaces and advanced twin epoxy powder paint protects the modular cabinet.

15 Claims, 9 Drawing Sheets

MODULAR AUTOMATIC COLORANT DISPENSER

FIELD OF THE INVENTION

This invention relates to the field of colorant pumps and, in particular, to a modular automatic colorant dispenser.

BACKGROUND OF THE INVENTION

Automatic Colorant Dispensers are well known in the art. Generally, colorants dispensed by these dispensers contain various abrasive and corrosive components including water. The prior art pumps used to dispense these colorants are of a lower quality, generic, single impeller "oil-pump" type usually produced from cast iron and are continuously exposed to the abrasive, oxidizing materials. These operating conditions cause dramatic wear to critical internal metering components in the generic prior art pumps resulting in their eminent failure usually within the first three months of normal system usage. These prior art pumps are very inconvenient to replace in existing prior art automatic colorant dispensers because of antiquated drive methods employed. These pumps are also very expensively priced and including the required qualified service technician labor, pump replacement can initially cost up as much as one tenth of the total system price.

Prior art pumps were never originally designed to pump colorants. Prior art pumps handled many different types of oils. These oils provided the much needed shaft lubrication. Because pumped colorants do not provide any lubrication, constant colorant abrasion under pressure attacks the solid cylindrical bearings needed to maintain the proper pump shaft rotational geometry in all prior art pumps. The prior art pump drive system torque requirements are extremely demanding, highly inefficient and drive up the overall electrical power requirements of the entire automatic colorant dispenser. A single prior art pump cannot be rotated manually indicating the extremely inefficient method of pump shaft bearing design.

Attempting to protect and to reduce the internal wear and damage caused by the hardened foreign matter in colorants, generic prior art pumps employ a ceramic plastic impeller. This material has proven to be a poor design choice for the application. Broken or chipped impeller teeth cause severe loss of calibration and reduce the pump output dramatically.

Prior art automatic dispenser manufacturers have also implemented individual colorant filters or strainer units attempting to protect their pumps from the foreign materials in the colorants. Because of the wide viscosity ranges of many popular colorants, the filters or strainers almost immediately clog up and starve their pumps of colorant. Because precise, repeatable metering is needed to deliver each colorant to achieve the desired color formula or recipe, the clogging causes the product to be mis-tinted and ultimately rejected.

Prior art dispensers usually contain from ten to sixteen colorant circuits each including one storage canister and one pump per colorant circuit. Prior art pumps are driven by either one of two ways.

The first method employs a large length of roller chain, associated idler sprockets to maintain chain positioning through the dispenser and a large horsepower motor with a gear reduction unit that provides the needed output power. The second method is employing an individual motor of significant fractional horsepower with a combined gear reducer to an individual prior art pump with horizontal shaft rotation. The majority of prior art automatic dispenser manufacturers all have chosen the single roller chain driven approach over of the large expense of multiple drive motor/gear reducers. Both of these drive approaches sacrifice individual precision metering because the prior art pumps were never designed to deliver dispense accuracies greater than $1/128$ of an ounce.

Replacement of pumps in the prior art has been difficult due to the pump locations and the critical realignment of these drive components must be completed in cramped confined space which is very time consuming. This intentionally reinforces that prior art pumps should only be replaced by factory approved service technicians.

Canisters of the prior art automatic dispensers have been produced from stainless steel tube with welded bottom plates. Each colorant canister in a system contributes significant weight to the system. In configuring prior art automatic dispensers to dispense water-based colorants for architectural paints and coatings, stainless steel canisters provide no significant structural advantages and could actually be replaced with other equally compatible canister materials such as PVC (polyvinylchloride) that are lighter and more easily machined.

Automatic dispensers in the prior art utilize a discharge nozzle component that allows each individual colorant circuit to come together in a small diameter. The prior art nozzles have many mechanical joints where components must be connected at mating surfaces. O-rings are needed to seal each joint. Every joint is a potential location for colorant to leak between individual circuits causing cross contamination of all of the colorants.

Automatic Dispensers in the prior art have been manufactured for over forty years using large, space consuming cabinets weighing in excess of a half ton with bulky roller conveyors attached to the front sections. Prior art cabinets were never efficiently designed for functional usage in providing adequate service access openings to critical internal components. Prior art dispenser manufacturers physically buried computers inside prior art cabinets eliminating the possibility of quick access or even simple upgrading of the operating PC system. For these types of customer service, an authorized factory service technician would be required to perform these tasks.

For many years, the Paint and Coatings market has been requesting smaller, more compact cabinets to fit the constantly shrinking floor space availability faced by paint retailers and manufacturers. Prior art manufacturers have responded to these requests only with automatic dispenser designs that suffer decreased performance and reliability to insure that their customer service departments maximized profitability.

Automatic dispensers in the prior art have always required the refilling of each of the colorant canisters. Prior art manufacturers have made the colorant refilling process a difficult task by placing certain canisters in extremely hard to reach locations. In some models, half of the colorant canisters used are at the rear of the dispenser making access to those canisters impossible. Prior art dispensers have been poorly designed with the addition of heavy, hard to move roller conveyors that span the entire front of the dispenser cabinets.

Prior art manufacturers have not addressed the serious ergonomic needs of the operator for the safe operation and maintenance of prior art automatic dispensers. Operators place themselves in potentially harmful physical positions when attempting to reach the inaccessible rear mounted canisters. Operators must straddle the bulky, front mounted roller conveyor in the refilling process while pouring heavy containers of colorant at arms length.

Addressing the electrical requirements and associated electronics of existing automatic dispensers in the prior art have basically operated in the very same way for as long as they have been manufactured. Presently offered systems operate using inefficient large horsepower motors to handle the demanding torque requirements of each out of date pump. Safety is an issue when trying to replace or repair a component that may be near any one of unguarded exposed roller chain paths. It is important to note that these systems have not improved with modern cutting edge technology, either in mechanical advances or in innovative electronics.

SUMMARY OF THE INVENTION

The present invention includes a specifically designed pump module, containing a precision dual bearing housing with two pairs of precision needle bearings, hardened dual shafts and impellers, an abrasion resistant, hard-coated pump chamber, twin Viton cartridge seals, an abrasion resistant, hard-coated lower cover plate and premium quality, quick disconnect fittings at inlet and outlet of pump chamber.

The present invention incorporates the pump, mounted on a pump drive bracket with power provided to the main pump shaft by a precisely controlled stepper motor. The stepper motor is directly connected to the driven pump shaft with a zero backlash coupling of solid design. The stepper motor is mounted to the top surface of the pump drive bracket providing simple but precise alignment of all three components. The pump module is physically attached to the base of the modular cabinet with a new 3M product that provides easy attachment, but this 3M foam adhesive product also cushions and eliminates vibrations and provides absolute silence during operation.

Therefore, it is an aspect of the invention to provide an efficient colorant pump with repeatable high accuracy.

It is another aspect of the invention to provide a colorant pump that delivers superior extended life.

It is still another aspect of the invention to provide a colorant pump that requires minimal torque to rotate.

It is a further aspect of the invention to provide a precisely supported bearing shaft geometry that will not fail under constant colorant pressure or contamination.

It is yet another aspect of the invention to provide an automatic colorant dispenser that has maximized modular design geometry and provides efficient, simplified repair or replacement of all critical parts.

It is still another aspect of the invention to provide an automatic colorant dispenser that operates quietly.

The present invention also incorporates a specifically designed canister module that is mounted in an ergonomic space-saving cabinet. The modular automatic colorant dispenser includes mounting provisions for up to sixteen canister modules. The canister modules are produced from PVC and have a lower plate and upper cover also fabricated from PVC. Each canister module is directly mounted to the top mounting plate surface in the new modular cabinet. Each pump module is directly positioned under each canister module to optimize the input connection tubing geometry between pump and canister. No colorant filters or strainers are required or used in the present invention.

Each canister module includes a built-in colorant agitator motion system. An individual agitator motor is connected to the bottom plate of each canister. A center pipe is threaded into the canister bottom plate with a Viton o-ring sealing the threaded pipe connection. The center pipe is fitted with small bearings at the top and bottom of the pipe. The agitator shaft rotates inside the center pipe and directly connects to the agitator motor output shaft.

The specifically designed ladder fin agitator provides slow, gentle agitation of all colorants and is fully programmable to handle even the most demanding colorants. The canister module has been designed to allow simplified replacement by removing four screws in the top mounting plate and disconnecting the inlet, outlet lines and unplugging the electrical connection to the agitator drive motor.

The present invention also incorporates each component module into a specifically designed modular automatic dispenser cabinet. The modular cabinet has been designed to efficiently house all automatic dispenser component modules. Up to sixteen colorant canister positions have been arranged in twin hexoidal canister patterns to reduce total cabinet space. Easy access to all system components modules has been provided through four (4) full width panels. One panel each on the left and right sides and two panels at the rear allow maximum open access of all dispensing components. Each panel is the same physical size and is fitted with a keyed lock.

The present invention incorporates additional features into the modular automatic dispenser cabinet that provide safety to the operator. Two hinged top panels provide full open access to all colorant canisters for easy refilling of colorants. Both left and right side panels are equipped with air dampened shock cylinders to eliminate any possibility of premature panel closing. Both panels will safely remain in a vertical position until the operator physically closes the top panels.

The present invention incorporates a centrally located compartment that houses up to sixteen individual solenoid valves. The forward, upper central cabinet location for these valves is critical in maintaining a minimal length of output tubing between each colorant circuit solenoid valve and their corresponding discharge nozzle connection.

The modular automatic dispenser cabinet has been designed with a small cabinet protrusion at the upper front center area that houses a discharge nozzle module of compact geometry. All required colorants to produce a specific paint formula can be simultaneously dispensed from this compact discharge nozzle module without any opportunity of colorant contamination between colorant circuits.

Each colorant circuit in the discharge nozzle module is equipped with a quick disconnect fitting allowing direct connection to each solenoid valve with an absolute minimal length of tubing. The modular automatic colorant dispenser cabinet provides a removable discharge nozzle module cover for full access to this modular component. A flush mounted upper cover is also provided for full access to the complete solenoid valve array and the associated colorant circuit tube piping.

It is another aspect of the invention to provide an automatic colorant dispenser with a nozzle that does not leak or drip.

The present invention incorporates two built-in retractable, stainless steel shelves for simplified dispensing of colorants into both one (1) gallon containers and also five (5) gallon buckets. When retracted, both shelves are flush to the front surface of the modular cabinet. The five gallon shelf has been designed into a flush mounted opening is the full width of the cabinet.

A specifically designed spring loaded, locking latch mechanism is centrally located below the five gallon shelf The two-piece locking arm is fabricated from multiple laminated steel plates for maximum strength. The locking latch design provides positive locking of the shelf in the operating position and can withstand four times the actual load.

The simple lifting of the shelf allows the spring-loaded detent to release the shelf for flush mounted storage. This detent is automatically reset when the shelf is lowered, allowing the next locking motion to occur.

The stainless steel working surface of the five (5) gallon shelf has been formed with three full width horizontal ribs to assist in the movement of five (5) gallon pails and totally eliminates the need of bulky, space consuming conveyor rollers. When placed in the appropriate dispense position on this shelf, with the filler cap or "bung hole" opened, a five (5) gallon pail will maintain precise alignment to simultaneously receive the required colorants.

The one (1) gallon shelf is located above the five (5) gallon shelf and flips down to provide a solid stainless steel work surface for processing up to three one (1) gallon containers. When this shelf is flipped up, the shelf becomes flush to the cabinet front surface. When placed in the appropriate dispense position on this shelf, with the can lid removed, a one (1) gallon can will maintain precise alignment to simultaneously receive the required colorants.

It is another aspect of the invention to provide an apparatus for connecting a support shelf to a work surface that maintains space efficiency.

The present invention also incorporates a flush mounted access panel cover located between the one (1) gallon shelf and the cabinet mounted discharge nozzle module. This front access panel may be removed to access the entirely self-contained electronics bay.

The flush mounted electronics bay is a steel fabrication that houses all of the electronic components that provide signals and power to each internal module. This includes a compactly designed printed circuit board rack with individual printed circuit cards controlling internal processing, power management and digital switching functions. This electronics bay also houses up to sixteen stepper motor controller cards that individually control each stepper-motor driven pump module.

The electronics bay has also been designed to fully comply with all applicable emission regulation and safety compliance guidelines and to provide the required airflow ventilation needed to maintain the appropriate electrical component environment. The electronics bay access cover is secured with six hex flathead fasteners.

The present invention also incorporates heavy-duty swivel casters at each corner of the modular automatic colorant dispenser cabinet for easy positioning. Two heavy-duty levelers are provided, one at each side near the front edge of the modular cabinet to maintain maximum stability of the modular automatic colorant dispenser after proper positioning has taken place.

The present invention incorporates the stepper-motor driven pump modules, the colorant conditioning canister modules, the solenoid valve array module and discharge nozzle module into a compact, space saving 24"×48" footprint that weighs approximately half of all prior art systems. Each individual sub-system module can be easily accessed for inspection or replacement with ultimate simplicity.

The present invention incorporates a low-profile computer tray that glides from left to right over each of the upper cabinet top panels. The computer tray is fabricated from lightweight aluminum and contains eight (8) miniature rollers that allow effortless movement of the personal computer (PC), monitor, keyboard, mouse and other peripherals. A rear mounted tethered cable limits the overall travel of the computer tray. The tray provides full access to either of the two top panels for colorant refilling procedures but does not use valuable space inside the modular automatic dispenser cabinet.

It is another aspect of the invention to provide a cabinet for a modular automatic dispenser that is space and weight efficient.

The operating sequence for this system occurs as follows. The external PC communicates to the internal digital controller via standard RS-232C communications protocol and instructs the automatic colorant dispenser as to which colorants and in what amounts are to be delivered for each dispensing cycle. When the container is placed in the appropriate position on the appropriate shelf, the operator presses the dispense button on the keyboard. The digital controller activates each of the required colorant circuit valves and each of the required stepper-driven colorant pumps to simultaneously dispense all colorants into the container. Depending on the specific formula and container size, new FlowMaster pumps accurately and repeatably dispense formulas in as little as five seconds up. The tinted container is then removed from the shelf, re-sealed or re-capped and then thoroughly mixed.

Colorants are automatically recirculated throughout each colorant canister circuit by programming into the pc, a specific amount of appropriate recirculation. The pump modules are gravity fed colorant from each canister module and if a specific colorant has not been chosen for a considerable amount of time, the pump module will activate and pump the respective colorant through the pump, up to the respective solenoid valve, and back to the upper return fitting of each canister.

For normal periods of inactivity, each colorant canister will engage the agitator drive that is built into each canister. The agitator drive provides a gentle six (6) rpm stirring motion to the colorant and the specially designed ladder fins rotationally raise the heavier materials, which want to settle to the bottom of the canister. This gentle motion is also programmably controlled. For extended periods of inactivity, a discharge nozzle cover or cap is provided to seal off air from each individual colorant circuit in the discharge nozzle module.

It is another aspect of the invention to provide an automatic colorant dispenser that efficiently operates all sub-systems using low voltage D.C. power components for maximum energy efficiency.

These aspects of the invention are not meant to be exclusive and other features, aspects, and advantages of the present invention will be readily apparent to those of ordinary skill in the art when read in conjunction with the appended claims and accompanying drawings.

DETAILED DESCRIPTION OF THE INVENTION

Figure 1:
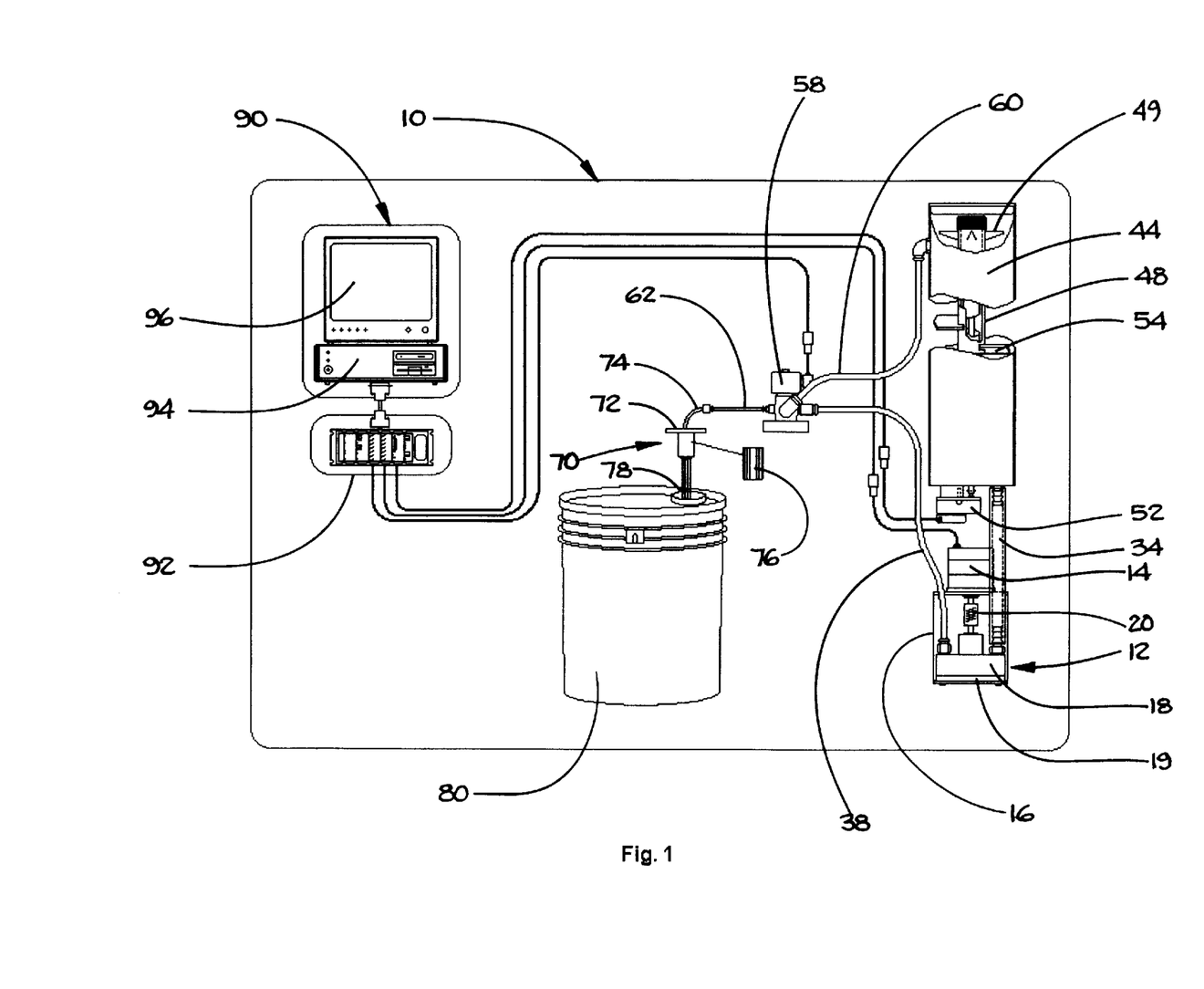
FIG. 1 is a schematic view of the modular automatic colorant dispenser according to the present invention.

Referring first to FIG. 1, a schematic of the present invention is shown. For illustration purposes only, FIG. 1 represents a schematic of one component of the modular automatic colorant dispenser 10, equipped with only one pump module 12. However, in the preferred embodiment, and other embodiments, the modular automatic colorant dispenser system 10 is configured with multiple pump modules 12. Therefore, FIG. 1 serves only for illustration and explanation purposes.

The modular automatic colorant dispenser system 10 in FIG. 1 is one pump module 12. The pump module is driven by a stepper motor 14. The stepper motor is positioned directly above the pump module 12 by a bracket 16 and is directly coupled to the pump body 18 by a zero backlash shaft coupling 20. The rotational accuracy of the stepper motor 14 allows the pump module 12 to precisely meter on the order of $\frac{1}{512}$ of an ounce. The pump module 12 pumps average viscosity colorant at approximate rates up to 40 ounces per minute.

Figure 2:
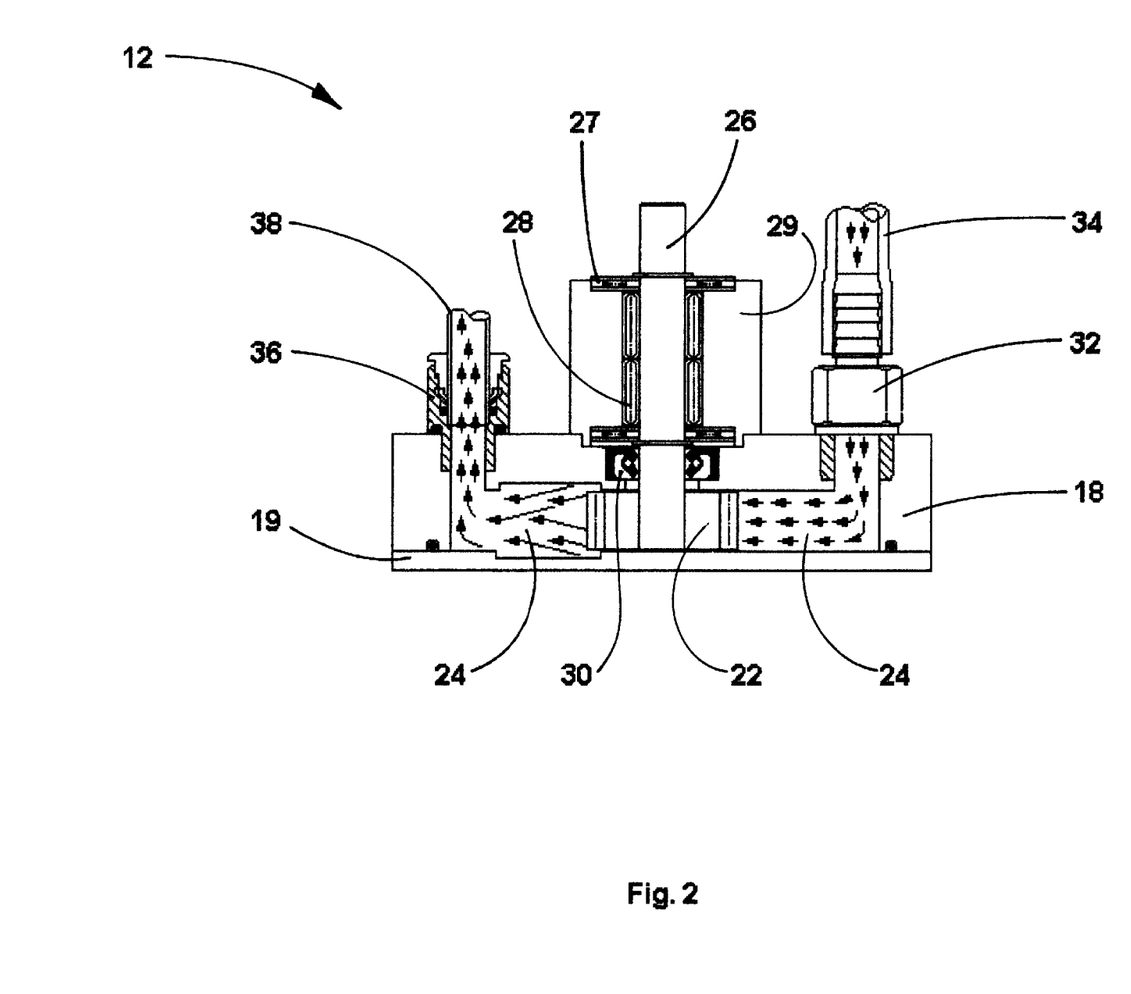
FIG. 2 is a cross-sectional view of the preferred embodiment of the colorant pump used in the modular automatic colorant dispenser shown in FIG. 1.

Referring now to FIG. 2, a cross section of the pump module 12 is shown. The pump body 18 includes twin impellers 22. Twin impellers 22 are preferably made from air hardened tool steel that receive an extremely hard, heat treating process. This hardened material process assists the twin impellers 22 in pulverizing any foreign materials passing through the pump chamber 24 with the colorant. Filters or strainers are used in the prior art in order to remove the "bead-milling" spheres used in the milling and blending procedures performed by the colorants manufactures.

Traditional bearing assemblies used in prior art pumps are made of solid bronze in a cylindrical type form having marginally short operational life, especially in hostile and abrasive colorant environments.

In the pump module 12, the precision needle bearings 28 and needle thrust bearings 27 will operate at or less than 170 rpm, ensuring that the needle bearings 28 and needle thrust bearings 27 will far outlast the pump module 12. The twin needle roller bearings, 27 and 28 provide superior shaft positioning accuracy and dramatically reduce the rotational friction and torque requirement over traditional bearing geometries employed in prior art pumps. Needle roller thrust bearings 27 and needle roller bearings 28 remain fully lubricated due to the bearing bore provisions provided in the bearing housing 29. In the preferred embodiment of the pump module 18, fully lubricated needle roller bearing units 27 and 28 will satisfactorily maintain the proper lubrication function when operating at the extremely low rotational requirements of the pump.

To prevent colorant leakage and contamination from entering the bearing housing 29 from the pump chamber 24, a shaft seal 30 is positioned on each shaft between these two pump components. The seal is a cartridge type which is well known in the art. The twin seal cartridges can be easily replaced with standard tools. Each of the two shaft seals 30 are made of Viton and incorporates a miniature spring reinforcing ring that maintains lip sealing geometry.

An inlet fitting 32 is connected to the pump body 18 and the inlet line 34 attaches to the pump module 12. The inlet fitting 32 and the inlet line 34 are preferably oversized to reduce flow restrictions entering the pump module 12.

However, these bead mill spheres and other foreign material present in the colorants when pumped through prior art pumps cause severe damage to internal pump components. Thus, filters and strainers were added in the prior art to remove these harmful particles. However, the filters and strainers soon become clogged, reducing or totally blocking the required flow of colorant, which in turn ultimately destroys the important calibration value. Thus, in the present invention, the twin hardened impellers 22 pulverize all foreign materials, including bead mill particles. The design features of the pump, in the present invention, totally eliminate clogged or restricted colorant flow with absolutely no damage to internal pump components. The twin impeller pump of the present invention delivers extended repeatable calibration stability, significantly extending pump life.

The stepper motor 14 as shown in FIG. 1 is rotationally connected to the bearing shaft 26 with a zero backlash solid shaft coupling 20. The bearing shaft 26 is in turn rotationally connected to the twin impellers 22, allowing the pump module to dispense precise measures of colorant.

The driven bearing shaft 26 and secondary idler shaft include twin needle bearings 28 to maintain precise rotational shaft positioning of both impellers. The driven bearing shaft 26 and secondary idler shaft further include twin needle thrust bearings 27 to maintain precise internal clearances between the twin impellers 22 and the pump body 18 and the lower pump cover plate 19.

Prior art needle bearing units have been shown to operate at 35,000 rpm in aerospace applications and have an extended lifetime compared to traditional bearing assemblies.

Similarly, the outlet fitting 36 is connected to the pump body 18 and the outlet line 38 exits the pump module 12. Both the inlet fitting 32 and the outlet fitting 36 have been designed to provide maximum sealing protection from colorant leakage at the pump body 18.

In the preferred embodiment, the inlet line 34 is made from oversized heavy wall Tygon extruded tubing that allows maximum unrestricted colorant flow using gravity feed into inlet fitting 32 of the pump module 12. High-density, hard walled polyethylene tubing of standard size commonly known and available in the art is used in all other tubing locations of the present invention.

The outlet line 38 is critical to the precise metering and repeatable delivery of colorants in the present invention. When the colorant leaves the pump module 12, the colorant is under significant pressure and therefore, the outlet line must withstand these pressures without deforming. In the present embodiment, the outlet line 38 utilizes this tough, hard walled, high-density polyethylene tubing to prevent any internal deformation or other physical diameter changes in the tube.

Prior art colorant dispensers that do not use this type of hard-walled tubing experience certain cross-sectional tube deformation of the outlet tubes. Maintaining the inside diameter of the tubing is critical in holding the constant calibration value of each colorant pump. Prior art dispensers fail to maintain calibration due to usage of improperly specified tubing.

The present invention does not have a pressure differential rate, therefore, possesses a constant efficient fluidity because of the oversized, unrestricted inlet tubing 34 and the hard-walled, internal diameter maintained outlet tubing 38 pump connections. Therefore the present invention has superior calibration consistency.

Figure 3:
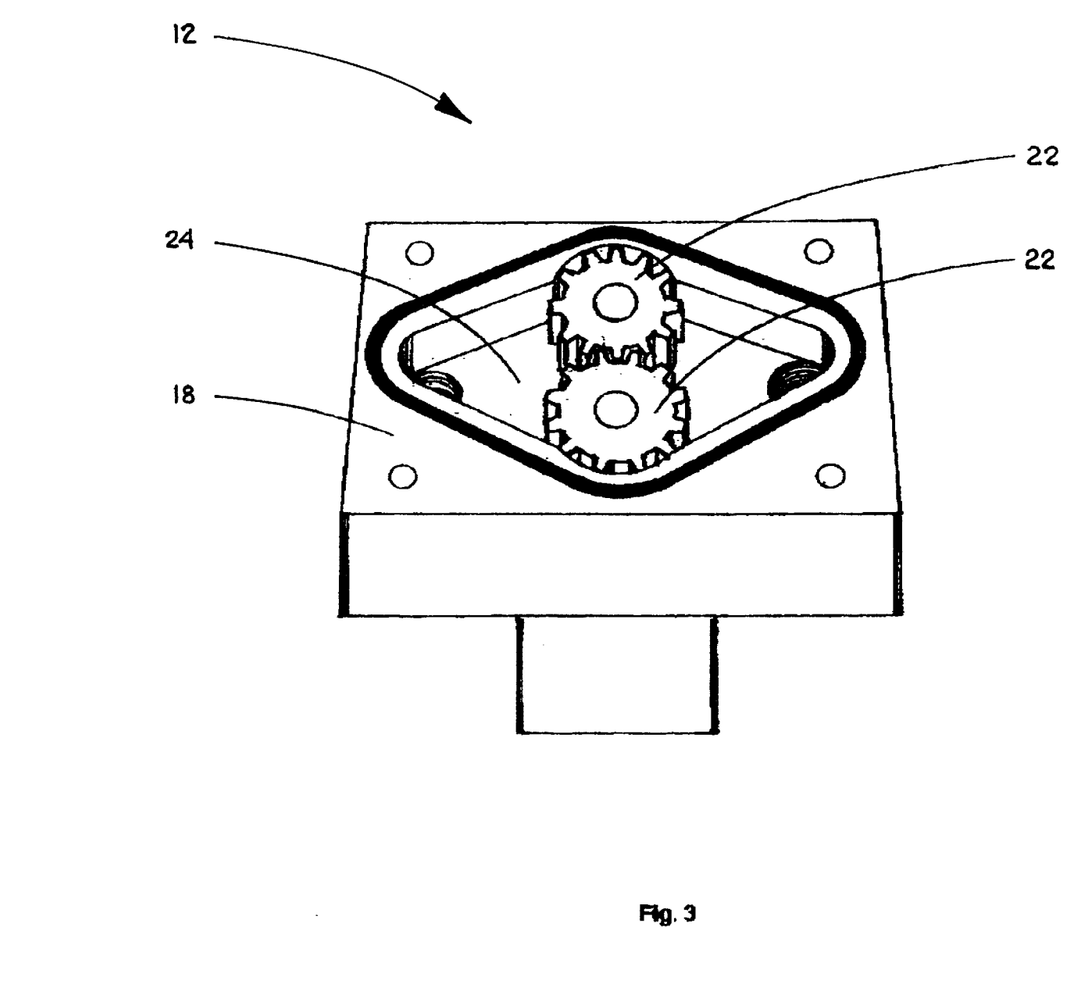
FIG. 3 is an isometric view of the twin impellers located inside the pump module.

Referring next to FIG. 3, the twin impellers 22 are shown engaged inside the pump body 18. The manufacturing tolerances of the twin impellers 22 and the pump body 18 are within +/−0.002 inches and are therefore dimensioned to leave only minimal gaps between the twin impellers 22, the pump body 18 and the pump bottom cover plate 19. Both pump body 18 and pump bottom cover 19 are made of 6061-T6 Aluminum Alloy. The internal machined surface clearance dimensions allow the pump body 18 and the pump bottom cover 19 to be processed with an aerospace developed, state-of-the-art, hard coat process that produces a built-up, uniform, hardened surface that provides maximized abrasion resistance against all known abrasive colorants. The process is known as Magnaplate HCR and is provided by General Magnaplate Corporation in Linden, N.J. This tough, durable process dramatically extends the life of the pump module.

Figure 4:
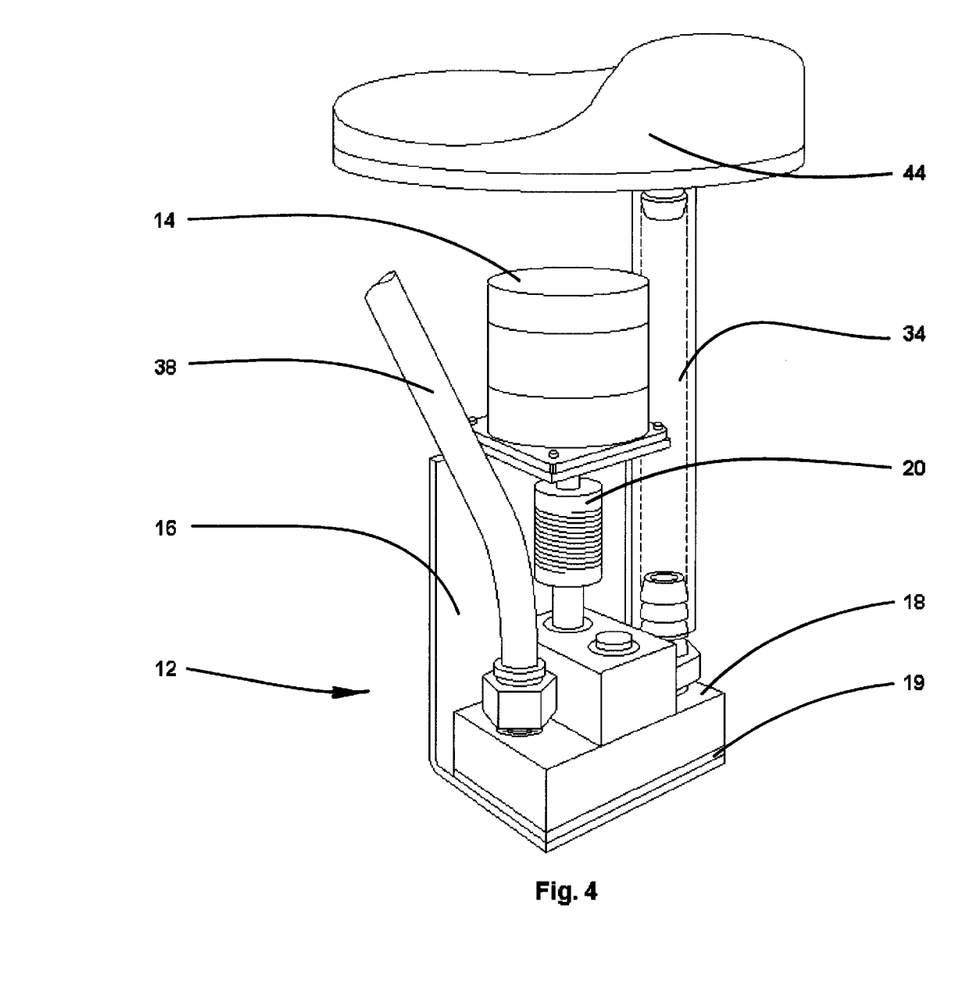
FIG. 4 is a cut away view of the pump module, as it would appear inside the cabinet.

Referring next to FIG. 4, the pump module 12 is shown in its preferred embodiment. As depicted here, the pump module 12 is directly connected to the colorant canister 44 by the inlet line 34. The pump module 12 is connected to the remainder of the modular automatic colorant dispenser system by the outlet line 38. The present invention has modular capabilities in part because of the pump module 12.

Building the multiple embodiments of the modular automatic colorant dispenser system entails placing as many pump modules 12 as colorant varieties desired and connecting each pump modules 12 to a respective colorant canister 44.

Figure 8:
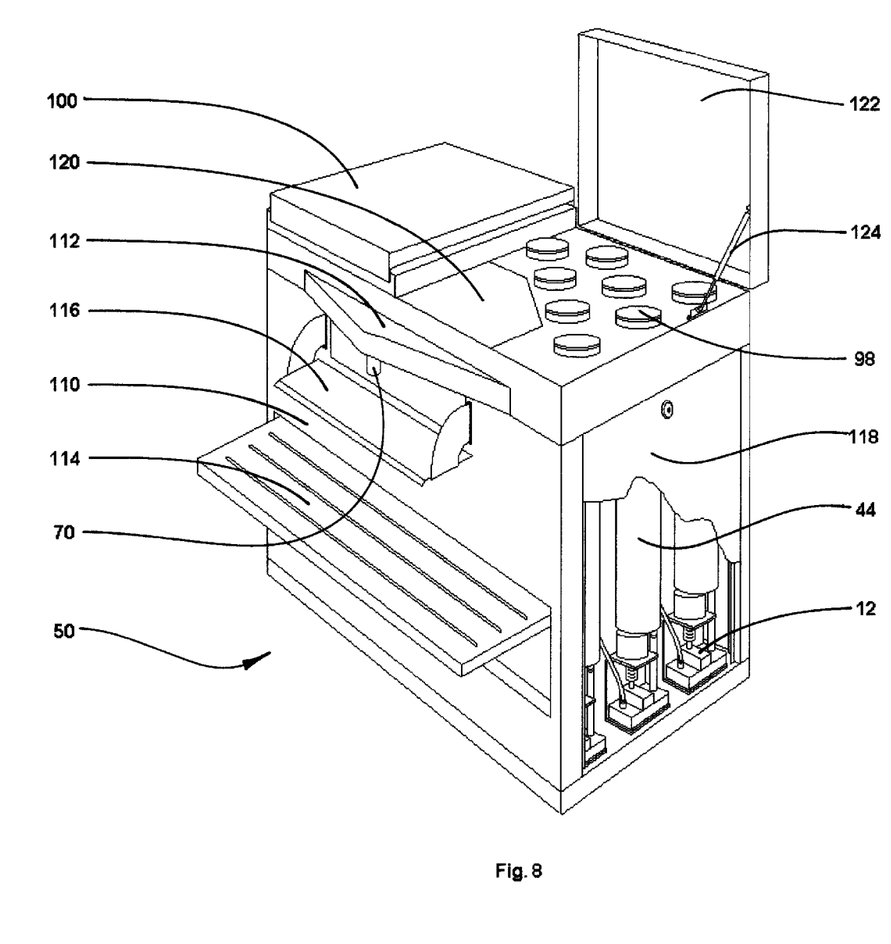
FIG. 8 is an elevated view of the preferred embodiment of the modular cabinet, with a cut away view of the inside of the cabinet.

The pump body 18 and the stepper motor 14 are connected to the bracket 16. When placing the pump module 12 into a modular automatic dispenser cabinet 50 (as shown in FIG. 8), the bracket 16 is attached to the cabinet.

The number of pump modules 12 placed into a cabinet varies according to individual preference, giving the present invention the capability of adapting to various individual and industrial needs. It is this feature of the present invention that makes the automatic colorant dispenser modular in nature.

Figure 5:
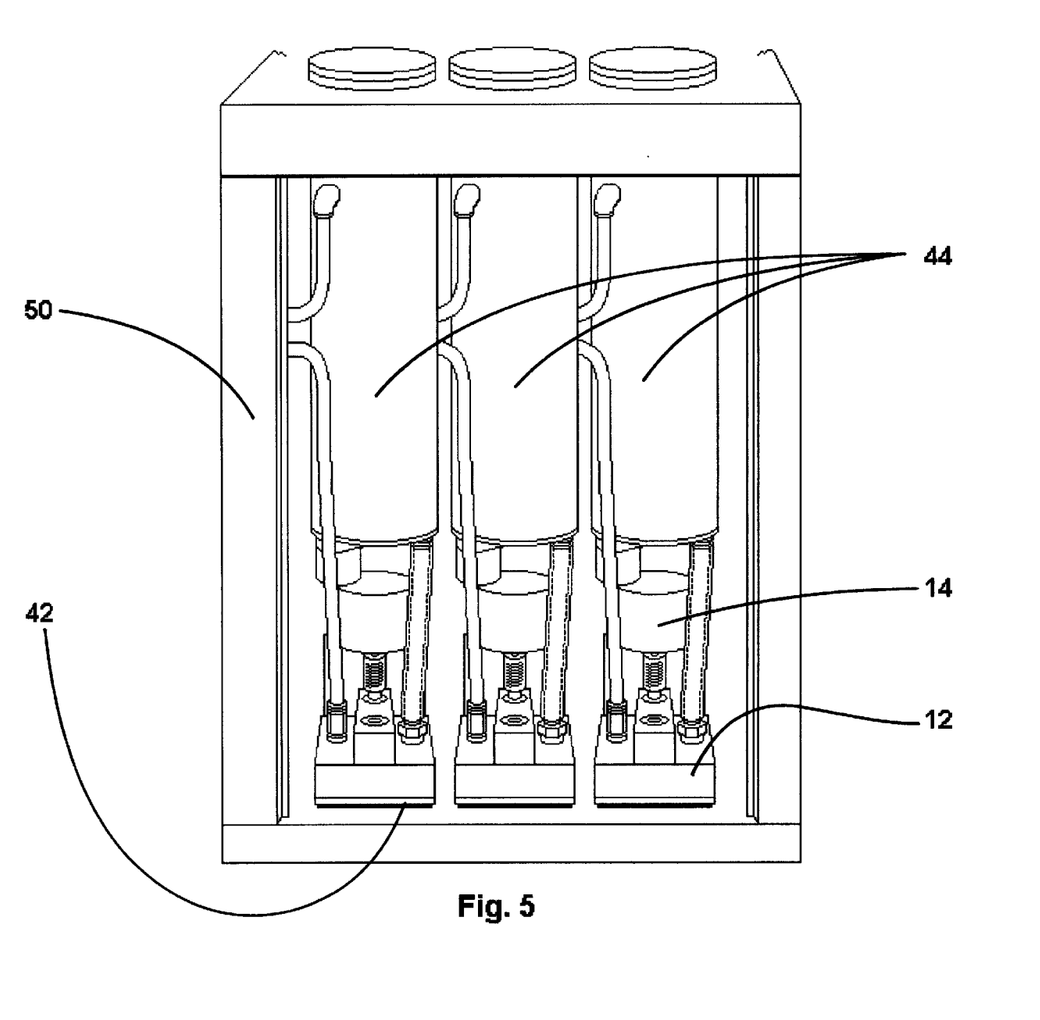
FIG. 5 is an inside view of the arrangement of the pump modules inside the cabinet.

Referring next to FIG. 5, a multitude of the pump modules 12 are mounted inside the cabinet 50. The pump modules 12 are attached to the bracket 16 (as shown in FIG. 4) and then the bracket 16 (as shown in FIG. 4) is attached to the pad 42. The bracket 16 is then mounted into the cabinet 50 using the pad 42. The pad 42, in the preferred embodiment, is a foam structured, double backed adhesive mounting tape. The pad 42 not only firmly attaches the bracket onto the cabinet 50, but in addition, provides excellent vibration isolation and noise isolation.

The pad 42 creates a ⅛ of an inch gap between the bracket 16 and the cabinet 50, which channels out all of the harmonics. Additionally, the pad 42 allows pump module 12 to operate more accurately. In alternative embodiments of the present invention, the bracket 16 is mounted into the cabinet 50 using mechanical fasteners commonly used in the art.

Because each pump module 12 contains its own stepper motor 14, no driving mechanism or roller chain drive network is needed to connect all of the pumps, allowing the inside of the cabinet 50 to remain relatively open. The canisters 44 are suspended entirely from the top mounting surface of the cabinet 50, eliminating the need for canister supports, and this farther opens up the inside of the cabinet 50. The canisters 44 hold the individual colorants and are preferably made of PVC plastic or a similar compatible material. In the preferred embodiment, the canisters 44 have a capacity of 9 quarts.

This is an additional design feature of the invention allowing a standard colorant filling capacity of 8 quarts. With the additional quart of colorant provided to each pump, the system always is primed and ready, without allowing a total depletion of colorant in the pumps. As shown in FIG. 1, the canister 44 supplies colorant to the pump module 12 through the inlet line 34. Flow restriction between the canister 44 and the pump module 12 has been eliminated due to the absence of in-line filters or strainers as in prior art dispensers. As shown in FIG. 2, an oversized inlet fitting 32 and an oversized inlet line 34 have been employed to maintain maximized gravity fed colorant flow.

Referring again to FIG. 1, in practice, the modular automatic colorant dispenser system performs as follows. Each canister 44 includes an agitator 48 to stir the contained colorant. The agitator 48 is driven by an agitator drive module 52 located underneath the canister 44 and is preferably rotationally driven at approximately 6 rpm. The agitator drive module 52, in the preferred embodiment combines a small, low voltage, fractional horsepower synchronous motor with an integral gear reducer combined into a single compact housing that deliver the needed output speed with additional reserve torque for more demanding colorants. The agitator 48 includes multiply placed ladder fins 54.

Each ladder fin 54 serves to break-up potential air-dried colorant that may form a skin at the top surface of the colorant when the agitator drive 52 is activated providing rotation to the agitator 48. The precise angular positioning of each ladder fin 54 on the agitator 48 provides gentle upward guidance of the colorant insuring the proper recombining of settling colorant pigments.

The top section of the agitator 48 in the preferred embodiment provides attached tabs that serve as a can rest. These agitator 48 attachments have been specifically designed to aid in the refilling of colorant by safely suspending an opened quart can of colorant in the inverted, colorant refilling position. By resting an opened can of colorant on the provided can rest attachments 49, all colorant can be efficiently drained from each colorant container, thus maximizing the removal of colorant into each colorant canister 44. In the preferred embodiment, the ladder fins 54 are fabricated of stainless steel, because of the highly corrosive and staining characteristics of the colorants.

Once the colorant travels by gravity feed from the canister 44 via the inlet line 34 and through the pump module 12, the colorant enters the outlet line 36 and travels to the valve 58. The valve is a solenoid operated 3-way valve of spool type design. Using compact modular design, the valves 58 are conveniently mounted in a modular valve rack allowing easy installation and removal of each required valve. Each valve 58 is provided with three quick disconnect fittings, one to connect the outlet line 38, one to connect the return line 60 and one to connect the discharge line 62. Colorant is only dispensed through the solenoid valve to the discharge nozzle 70 when the electrical coil of the valve 58 is energized. The remaining unneeded, metered colorant from outlet line 38 is returned to the canister 44 through return line 60.

In the preferred embodiment of the invention, the valves 58 provide leak proof sealing for maximized performance under safety compliance guidelines for dispensing the more demanding flammable pumped media such as automotive type acrylic lacquer based finished and other similar coatings product in prior art markets.

Additionally, each of the solenoid valves 58, in the preferred embodiment operate on 24 VDC, each of the stepper motors 14 also operate on 24 VDC and the agitator drive motors 52 each operate on 24 VAC. In the preferred embodiment of the invention, a compact power supply has been specifically designed to provide these low voltages requirements. In particular, because of the specific power requirements incorporated in this preferred embodiment, the invention meets or exceeds compliance guidelines set by the National Fire Protection Agency (NFPA) explosion-proof compliance rating.

This multiple output power supply is input switchable to accommodate both 120 VAC, 60 Hz operation (used in North America) and 220 VAC, 50/60 Hz operation (used internationally) input voltages.

Figure 6:
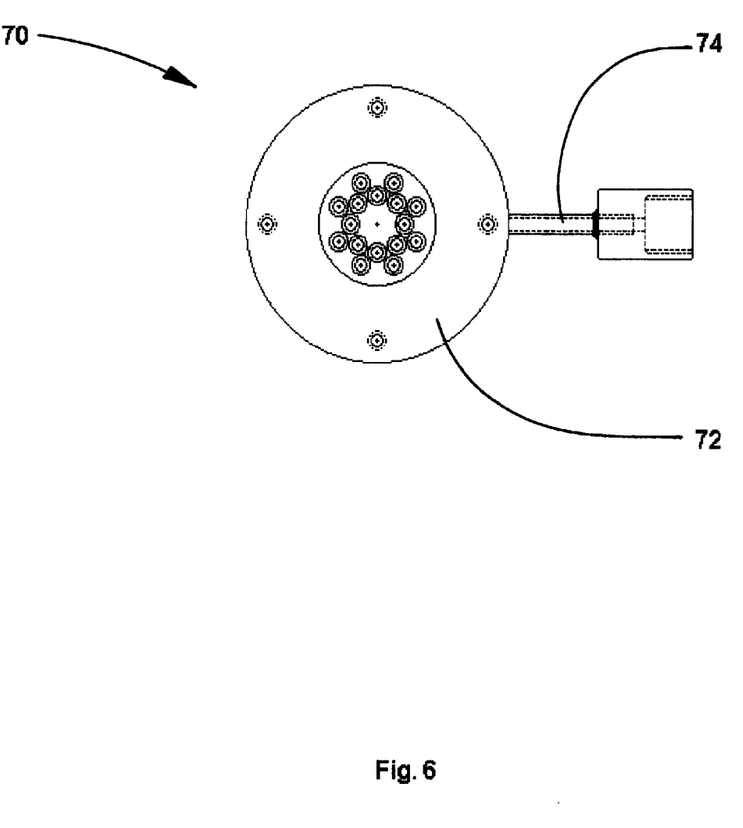
FIG. 6 is a bottom view of the preferred embodiment of the discharge nozzle module used in the modular automatic colorant dispenser of FIG. 1.

FIG. 6 shows to bottom view of the discharge nozzle assembly 70. The discharge housing 72 provides positioning and attachment hole for each of the required discharge tubes 74. As shown in FIG. 1, the discharge nozzle assembly also includes the discharge nozzle cap 76, which acts as a sealing device to prevent premature drying of the colorants held in the tip of each discharge tube 74. The discharge nozzle cap 76 employs twin o-ring grooves which position two Viton o-rings. The o-rings seal against the outside diameter of the discharge housing 72 providing a positive internal sealing area for all of the nozzle discharge tubes with frictional fit to maintain a firm holding capability around the discharge housing 72 outside diameter.

Colorant is dispensed from the discharge nozzle assembly 70 into the waiting container 80, through a stream of colorant 78. The efficient tight geometric grouping arrangement of each required nozzle discharge tube 74 in the nozzle discharge housing insures the safe and complete metered discharge of all required colorants without any cross contamination of colorants.

Figure 7:
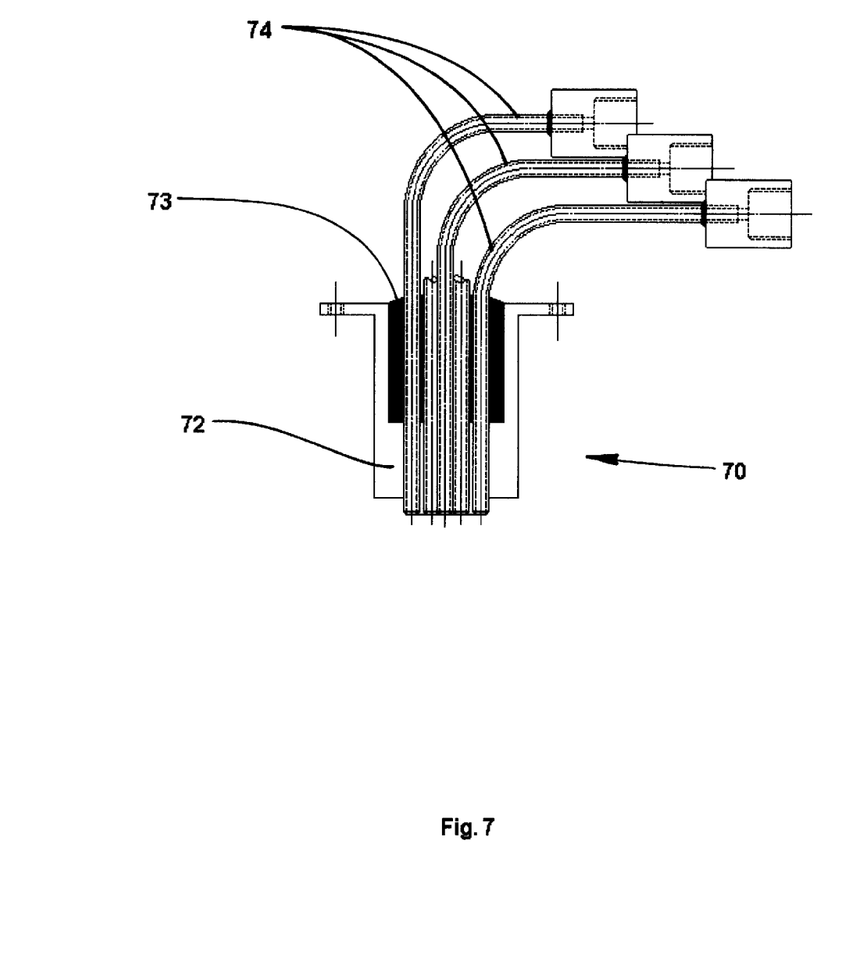
FIG. 7 is a cut away view of the discharge nozzle module tube arrangement used in the modular automatic colorant dispenser of FIG. 1.

Referring next to FIG. 7, in alternative embodiments, the nozzle discharge tubes 74 are collectively positioned and fitted into the discharge nozzle housing 72. FIG. 7 demonstrates multiple discharge nozzle tubes 74 affixed to the discharge nozzle housing 72, penetrate the wall of the cabinet. Strong and durable potting epoxy 73 is used to permanently secure each required discharge nozzle tube 74. After all tubes have been inserted and correctly positioned, the epoxy is back filled into the provided epoxy well of the discharge nozzle housing 72. The nozzle discharge tubes 74 are preferably made of stainless steel tubing incorporating a single 90 degree bend to align each nozzle discharge tube with their respective corresponding valve 58 output fitting. A single discharge line 62 is connected between valve 58 and discharge nozzle tube 74, simplifying assembly of the preferred embodiment of the invention.

Returning again to FIG. 1, the modular colorant system 10 also includes a compact, built-in electronics bay in the modular automatic colorant dispenser cabinet 50. This bay houses the control and diagnostic module 92. These operating and diagnostic functions are designed into multiple standard euro-card formatted printed circuit boards.

These cards are conveniently mounted into a standard EIS printed circuit board rack with a corresponding back plane board to facilitate all incoming and outgoing electrical system connections.

These cards are of standard formatted size commonly found in the art. One card controls the power distribution for the system, the second card houses the internal computer control processor, and the third and fourth cards provide the collective switching capabilities that drive the individual components that control the power going to each valve and stepper motor controller card.

By removing the six screws that secure the electronics bay front access panel, all printed circuit cards may be easily replaced or swapped in each corresponding track of the card cage. The electronics bay in the modular automatic colorant dispenser cabinet 50 also houses each of the individually required stepper motor drive cards.

By incasing the entire modular electronics sub-system in the single, well shielded, well ventilated electronics bay, the preferred embodiment of the invention fully complies with all applicable FCC compliance guidelines addressing both EMI and RFI issues.

Referring again to FIG. 1, the computer control module 90 includes a processing unit 94 and a display 96. The computer control module 90 provides simple, easy upgrade of the standard PC 94. Calibration and metering values, diagnostic and system data for general operational maintenance may be easily programmed into any future PC upgrade.

FIG. 1 shows only one pump module 12, one canister 44, one valve 58 and one nozzle 74 for the sake of simplicity in the schematic. However, in practice, multiple pump modules 12, multiple canisters 44, multiple valves 58 and multiple nozzle discharge tubes 74 are used, generally one for each desired colorants of that specific colorant system, in the dispenser system.

Each of these is referred to as a colorant circuit configuration. Preferred embodiments of the invention dispense in 10, 12, 14 or 16 colorant circuit configurations, and as such, include 10, 12, 14 or 16 of each of the above elements, respectively. However, in alternate embodiments, the number of colorant circuits can be greater to accommodate color system criteria requiring a greater number of colorants.

Even with a plurality of colorant pumps, each individual pump is driven by its own stepper motor, which is individually controlled by an individual stepper motor driver control card, individually controlled by the system control module. Therefore, there is no need to connect each pump with a roller driven chain drive, which leaves more free space inside the dispenser cabinet.

Additionally, as the canisters are fully suspended from the top mounting surfaces of the cabinet, even more space is available inside the cabinet because there are no lower canister supports. As such, embodiments of the present invention can be compact due to the open architecture of the cabinet. Each individual pump module 12 is driven by a separate stepper motor 14. Each pump module 12 runs only when that specific colorant is needed. This feature is unlike prior arts, where all pumps are connected together by roller drive chain arrangements, requiring all of the pumps to be operated constantly. Therefore the present invention eliminates this requirement, extending the life of each individual pump because each pump module only operates when required to deliver that specific colorant.

Referring next to FIG. 8, the preferred embodiment of the modular automatic dispenser cabinet 50 is shown. The cabinet 50 is preferably made of a metal strong enough after forming to support the multiple canisters 44 filled with colorant and suspended from the top surface of the cabinet.

Additionally, the cabinet is preferably made of a non-corrosive material. In the preferred embodiment of the invention, the upper section of the cabinet is fabricated from stainless steel, which is inherently stain and corrosion resistant, thereby not damaged by the colorants. But, in the alternate embodiments, the cabinet can be constructed of any material known in the art.

The top of the cabinet 50 includes two upper access panels 122. Each upper access panel 122 is approximately one half the width of the cabinet, and thereby, the cabinet 50 is capable of being divided into two halves. The individual right and left upper access panels provide easy access to all of the colorant canisters 44 specifically the canister lids 98. These upper access panels 122 allow fill access to the valve array and discharge nozzle section built into the modular cabinet with a large access panel 120. All solenoid valves 58 in the configured array and discharge nozzle assembly 70 are conveniently positioned under the large centrally located access panel 120. Each of the two upper access panels 122 are equipped with air cushioned closures 124, which prevent the top access panels 122 from crashing down against the cabinet 50. Each half of the cabinet contains one half of the total number of colorant canisters 44. The computer control module 90 (see FIG. 1) is positioned on a compact low profile moveable platform 100. In the preferred embodiment of the invention, this computer tray freely rolls with a limited travel from right to left.

The moveable computer tray 100 is smaller in width than either of the two top access panels 122. The moveable computer tray 100 can only travel the safe distance permitted by the small tethered steel cable that attaches at the rear of the moveable computer tray 100 to a central point at the center of the modular cabinet 50.

In the preferred embodiment, the computer control module 90 sits atop the moveable tethered computer tray 100 allowing quick access to either the right or left bank of colorant canisters 44. In prior art dispensers, large cabinet areas have been solely designed to only house the PC computer and monitor thus wasting significant centrally located internal cabinet area as well as waste valuable floor space and overall foot print. The upper access panels 122 provide adequate internal clearance between the inside of the access panels and the top of the colorant canister lids 98.

The canisters 44 are arranged in a hexoidal pattern mirrored on each side of the modular cabinet 50 taking advantage of ergonomic spacing to reduce overall cabinet size. This spacing arrangement allows for a maximum number of colorant canisters 44 to be placed in a minimum amount of space. As shown in FIG. 8, the preferred embodiment of the cabinet 50 provides 16 spaces to accommodate 16 canisters 44.

FIG. 8 shows the modular cabinet 50 fully loaded to its capacity with 8 canisters 44 per each half of the cabinet 50. In practice, where less than 16 canisters have been configured for operation, a blank lid 98 will be placed over the unused blank colorant canister locations. When the canister lid 98 is removed from the canister 44, up to eight quarts of colorant may be poured and emptied into the appropriate canister 44 by resting the opened quart can on the designated attachments of agitator 48 until can is thoroughly emptied out. Like the colorant canisters 44, the canister lids 98 are also made from PVC.

The modular cabinet 50 also includes four lockable access panels 118. These panels allow for targeted and easy access to particular pump modules 12 or the complete access to all other internal cabinet 50 areas. The lockable feature of the four access panels 118 prevents the impermissible tampering or unauthorized access to or adjustment of any interior component systems including the pump modules 12.

The front side 110 of the modular cabinet 50 includes a small cabinet projection 112 where the discharge nozzle assembly 70 is firmly attached to this projection. This small cabinet projection 112 has been designed to occupy an absolute minimum of exterior space, thereby allowing the cabinet to fit into smaller operating areas.

Generally, containers 80 (as shown in FIG. 1) to be tinted with colorants are five (5) gallon containers. The cabinet front 110 of the modular cabinet 50 provides a strong, built-in, pull-up, retractable, five (5) gallon track shelf 114 to accommodate these sized containers 80. The working surface of this track shelf employs a heavily ribbed stainless steel track shelf 114 surface. There are three equally spaced ribs or rails that are formed into the stainless steel shelf surface that run the complete distance of the shelf Having an approximate length of 45 inches, the five (5) gallon track shelf easily accommodates three containers at a time.

The formed stainless steel work surface of the five (5) gallon shelf 114 raise each container up approximately ¼ inch above the shelf surface. Full five (5) gallon containers can weigh from 50 to 60 pounds each and by having that weight distributed on three individual shelf ribs, minimal effort or force is required to slide the canisters in and out of dispensing position and actually maintain that positioning.

Frequently, one (1) gallon and one (1) quart cans serve as the container 80, thus, in alternative embodiments, the container can be any size commonly used in the art. Therefore, to accommodate these smaller container sizes. The cabinet front 110 of the modular cabinet 50 further provides a strong, built-in, retractable one (1) gallon shelf 116. The pull-down shelf 116 is located directly under the cabinet projection 112 and directly above the five (5) gallon track shelf 114. The one (1) gallon pull-down shelf 116 is approximately 24 inches in width and provides a stainless steel work surface. The smaller sized containers are placed on the pull-down shelf 116 to receive dispensed colorant at a reduced distance from the discharge nozzle 70, thus avoiding colorant spatter. When not in use, the one (1) gallon shelf 116 can be easily flipped up to rest flush against the cabinet front 110 of the modular cabinet 50.

Heavy prior art roller conveyors employed at the front of prior art dispensers to easily move processed five gallon containers made the critical 2 inch diameter bung hole alignment in the container 80 virtually impossible. All colorants had to clear the opening in the can top for 100% delivery of all colorant, otherwise the desired formula color could not be attained.

In the preferred embodiment of the invention, the modular cabinet 50 has a total weight of approximately 440 pounds. Because of this low weight, the modular cabinet 50 is easier to fabricate, easier to ship, easier to maneuver, and occupies considerably less floor space than other automatic colorant dispensers found in the art. Additionally, because there are many older stores in less populated areas of the country and the world, the floors of these stores can not normally accommodate a very large and heavy automatic colorant dispenser.

Thus, with the present invention, these stores can accommodate the modular automatic colorant dispenser. Also, because of the efficient use of space in the cabinet, the modular automatic colorant dispenser occupies an absolute minimum of space, allowing smaller stores to accommodate the present invention.

Figure 9:
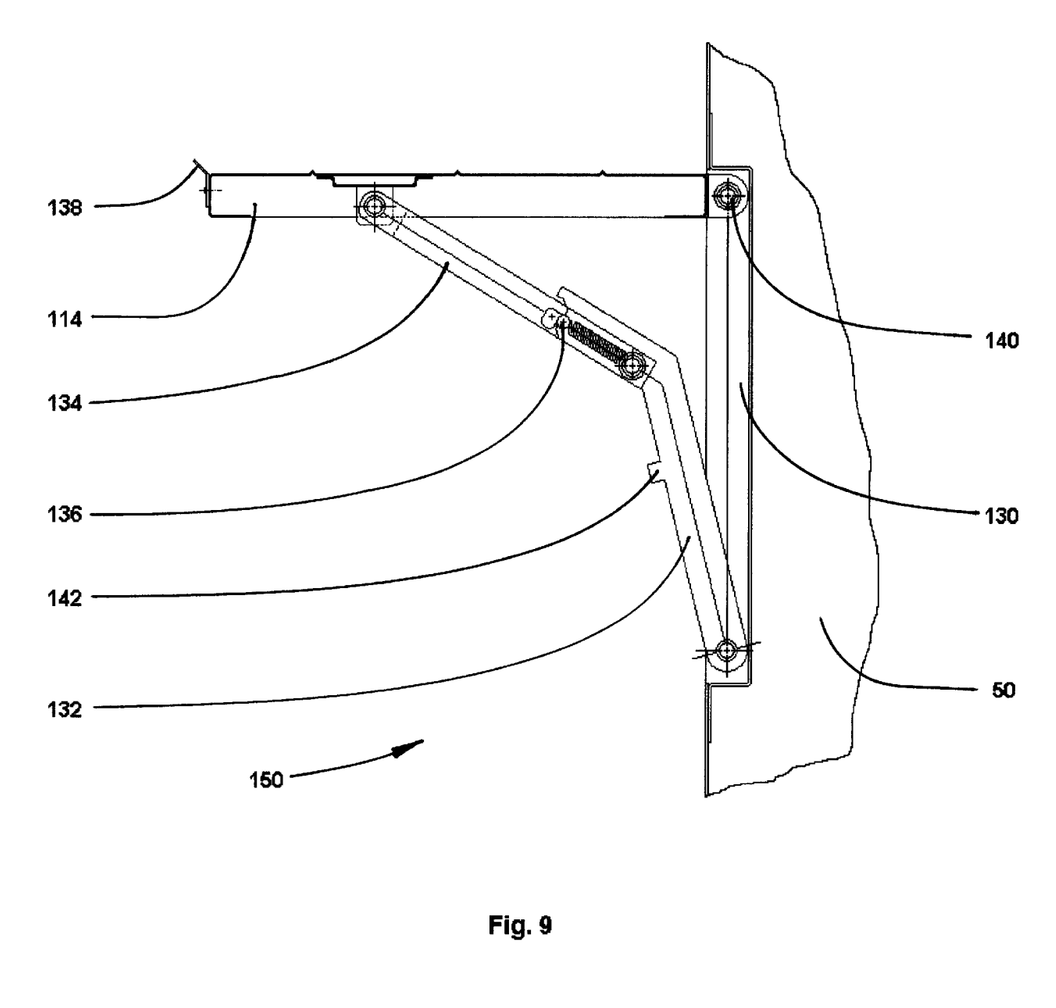
FIG. 9 is a cross sectional view of the locking latch mechanism used in the retractable, flush mounted, pull-up production shelf.

Referring next to FIG. 9, the locking mechanism assembly 150 for the retractable, flush mounted, pull-up five (5) gallon production shelf 114 is shown. Although the locking mechanism assembly 150 is shown in its preferred embodiment, as a pull-up production shelf 114 for the modular automatic colorant dispenser cabinet 50, this design could be used in any situation where a shelf is required that is pulled up for active use, and then pushed down to save space when not in use.

The pull-up five (5) gallon production shelf 114 is mounted onto the modular cabinet 50 into a recessed shelf housing 130 on the cabinet front 110. When the pull-up shelf 114 is in the resting position (not shown), the lower pivot arm 132 and the upper pivot arm 134 allow the pull-up shelf 114 to retract into the recessed housing 130 and become flush mounted with the cabinet front 110.

In practice, to transition the pull-up shelf 114 from resting position to active position, the user applies an upward force on the pull-up shelf 114 by pulling upward on the shelf handle 138 until a distinct click is heard and felt. The two large shelf pivots 140 allow the shelf to transition from resting to active position. The upward force in raising the shelf 114 causes a cam-type shape on the end of the lower pivot arm 132 to compress the springs of the spring loaded locking pin 136. The spring force insures positive locking between the upper pivot arm 134 and the lower pivot arm 132.

To transition the pull-up shelf 114 from the active position to the resting position requires a slight upward force of the shelf 114 until a distinct click is heard from the spring loaded detent mechanism, indicating that the shelf may be lowered to its resting position. At a point near the end of the lowering motion, the spring-loaded detent mechanism will reset itself for the next shelf raising motion. Additional strength is provided in the preferred embodiment of the invention by using multiple piece construction or lamination in both the upper pivot arm 134 and the lower pivot arm 132 connection. By utilizing several individual upper and lower pivot arms that are collectively ganged together, the unique spring-loaded mechanism provides maximum strength and durability for many years of faithful service. This design improves upon the basic toggle principle exhibited by prior art mechanisms. In the traditional toggle locking mechanisms, the user would be required be required to release the locking pin manually. However, with the locking exhibited in FIG. 9, using one hand, the user simply pulls the shelf up slightly, then lowers the shelf to the resting position and pulls up on the shelf until it has locked itself into the active position locked position. The unique spring-loaded detent mechanism automatically resets every time the shelf is lowered into the recessed shelf housing 130.

In practice, the modular automatic colorant dispenser system performs as follows. Referring again to FIG. 1, the colorant is stored in the canister 44, and the agitator 48 conditions the colorant. The colorant then passes from the canisters 44 through the inlet line 34. The stepper motor 14 then drives the twin impellers, located inside the pump body 18, to precisely pump and pulverize any particles in the colorant, and then the twin impellers propel the colorant through the pump module 12.

The rotational accuracy of the stepper motor 14 is translated to the pump body 18, providing extremely accurate metering of precise amounts of colorant. The colorant then exits the pump module 12 through the outlet line 38 and on to the valve 58. The valve 58 then distributes the precisely metered colorant through the discharge nozzle assembly 70 to the awaiting container 80, or returns the unused colorant back to the canister 44. Additionally, the modular automatic colorant dispenser system 10 thoroughly reconditions the colorant by programmed intervals. This efficient reconditioning is accomplished whereby the pump re-circulates colorant at programmed intervals through the return line 60 at the valve 58. The purpose of controlled reconditioning of colorants is to insure properly conditioned colorant is always ready to dispense from the modular automatic colorant dispenser system 10. In prior art dispensers, colorants have been damaged from over mixing causing the overheating of the colorants. Manually set timer control methods used in all prior art dispensers can not address the specific needs of each colorant due to their individual specific weights and chemistry.

Still referring to FIG. 1, the computer control module 90 allows a user to preprogram the precise amount of each colorant that will be dispensed into the container 80. Each stepper motor 14 is controlled from the computer control module 90, thereby controlling the precise amounts of colorant to be dispensed. The computer control module 90 allows the user to pre-program each stepper motor to dispense each colorant. Pre-programmed color formulas provide each individual stepper motor the information to produce the desired color formula.

Thousands of industry color system formulations can be stored in the hard drive of the computer control module 90, with virtually immediate access to the chromatic color values for many thousands of custom designed color formulations.

Although the present invention has been described with reference to certain preferred embodiments thereof, other versions are readily apparent to those of ordinary skill in the art. Therefore, the spirit and scope of the appended claims should not be limited to the description of the preferred embodiments contained herein.

What is claimed is:

1. A modular colorant dispenser, said modular dispenser comprising:
   at least one colorant module, said module comprising:
      a canister dimensioned to hold said colorant, wherein said canister has an agitator and a fin;
      a pump module, said pump module connected to said canister, said pump module comprising:
         a stepper motor;
         a bearing shaft rotatably connected to said stepper motor;
         a pump body receiving said bearing shaft, said pump body having a chamber through which said colorant flows and said pump body having an industrial hard coat;
         a seal between said bearing shaft and said pump body, whereby said seal prevent said colorant from leaking out of said bearing shaft;
         twin impellers rotated by said bearing shaft disposed in said chamber;
         wherein said stepper motor controls rotation of said bearing shaft and said twin impellers, and wherein said colorant flows through said colorant pump propelled by said twin impellers;
      an inlet line connecting said canister to said pump, wherein said colorant is pumped out of said canister and into said pump body through said inlet line, said inlet line having an inlet fitting to securably attach said inlet line to said pump body;

an outlet line, wherein said colorant is pumped out of said pump body through said outlet line;

a valve connected to said colorant pump for dispensing said colorant;

a nozzle connected to said valve to direct said colorant to a container; and a return line connecting said valve to said canister whereby excess of said colorant is returned to said canister through said return line;

wherein said at least one nozzle of at least one colorant module is connected to a nozzle assembly, wherein said nozzle assembly dispenses colorant to the container.

2. The modular colorant dispenser claimed in claim 1, further comprising a cabinet, wherein said modular colorant dispenser is disposed in said cabinet, said cabinet comprising:

a housing, said housing having a top, a floor, a front, and a back;

a projection on said front of said housing, wherein said projection is predisposed to accommodate said nozzle assembly from said modular colorant dispenser;

said top of said housing having a plurality of openings, said openings are a predetermined size to accommodate said canisters and said openings are in hexoidal relation to each other, whereby said canisters are suspended from said top of said cabinet;

a pull-down shelf for a small container, said pull-down shelf disposed on said front of said housing, and said pull-down shelf having a resting position and an active position, said pull-down shelf is located under said projection, whereby said pull-down shelf is pulled down to said active position only when using said small container, and said pull-down shelf is in said resting position when using a large container; and a pull-up shelf for a large container, said pull-up shelf is disposed on said front of said housing, said pull-up shelf being located under said pull-down shelf, whereby when said pull-up shelf is in use, said pull-down shelf is in said resting position, and whereby a container is placed on either said pull-down shelf or said pull-up shelf, and said colorant is dispensed from said valve modules and said nozzles located inside said projection.

3. The cabinet as claimed in claim 2, wherein said housing is a non-corrosive material strong enough to accommodate a multiplicity of said canisters suspended from said openings.

4. The cabinet as claimed in claim 3, wherein said housing has 16 openings.

5. The cabinet as claimed in claim 4 wherein said openings have a lid removably attached in said openings, wherein said lid is removed when a canister is disposed in said opening.

6. The cabinet as claimed in claim 5 said housing further comprising a protective lift top cover disposed over said top of said housing, wherein said lift top cover is constructed of the same material as said housing, and protects contents in said housing.

7. The cabinet as claimed in claim 5, wherein said protective lift top cover has two sections whereby each of said two sections can be lifted separate of one another.

8. The cabinet as claimed in claim 7 wherein said pull-up shelf is a three rail track shelf, wherein said three rail track aids in moving said large container.

9. The cabinet as claimed in claim 8 wherein said pull-up shelf is attached to a lock mechanism, said lock mechanism comprising:

an upper pivot arm having a top and a bottom, wherein said top of said upper pivot arm is pivotally attached to said shelf; and a lower pivot arm having a top end and a bottom end, said top end is pivotally attached to said bottom end of said upper pivot arm by a spring-loaded locking pin, and said bottom end of said lower pivot arm is pivotally attached to said work surface, whereby said spring-loaded locking pin locks said shelf into position, and whereby said spring loaded locking pin disengages upon the application of force onto said shelf.

10. The cabinet as claimed in claim 9, wherein said modular colorant dispensers are removably connected using mechanical fasteners to said floor of said cabinet.

11. The cabinet as claimed in claim 10 wherein said modular colorant dispensers are removably connected by a pad to said floor of said cabinet, wherein said pad is a vibration ablative pad.

12. The cabinet as claimed in claim 11, wherein said nozzle assembly is held in place in said projection by an epoxy.

13. The modular colorant dispenser claimed in claim 5, further comprising a diagnostic module, said diagnostic module having a plurality of control cards to control said modular colorant dispenser.

14. The diagnostic module as claimed in claim 13, said module having a computer interface, wherein said computer interface is in communication with said control cards.

15. The diagnostic module as claimed in claim 14, wherein said computer interface is slidably disposed upon said protective lift top of said cabinet, whereby when a user lifts said one of said two sections of said lift top, said computer interface can be moved to rest upon said other of said two sections of said lift top.

\* \* \* \* \*